United States Patent [19]

Boudreaux et al.

[11] Patent Number: 4,728,516
[45] Date of Patent: Mar. 1, 1988

[54] METHOD FOR THE PRESERVATION OF CREAMED COTTAGE CHEESE

[75] Inventors: Donald P. Boudreaux; Mark W. Lingle, both of Sarasota; Ebenezer R. Vedamuthu, Bradenton, all of Fla.; Carlos F. Gonzales, College Station, Tex.

[73] Assignee: Microlife Technigs, Inc., Sarasota, Fla.

[21] Appl. No.: 895,302

[22] Filed: Aug. 11, 1986

[51] Int. Cl.$^4$ .................. A23C 19/02; A23C 19/14
[52] U.S. Cl. ........................... 426/38; 426/43; 426/61; 435/822; 435/885
[58] Field of Search ............ 426/34, 36, 38, 42, 426/43, 61, 582, 321, 334–335; 435/42, 822, 885

[56] References Cited

U.S. PATENT DOCUMENTS

| | | | |
|---|---|---|---|
| 3,968,256 | 7/1976 | Sing | 426/38 |
| 4,172,899 | 10/1979 | Vedamuthu | 426/38 |
| 4,191,782 | 3/1980 | Vedamuthu | 426/38 |
| 4,477,471 | 10/1984 | Gonzales | 426/43 |

OTHER PUBLICATIONS

Prescott et al., Industrial Microbiology 4th Edition, AVI Publ. Co., Inc., 1982, pp. 116-121.
Gilliland, et al., Am Pub Health Assoc. (M. L. Speck, ed.) pp. 173-178 (1976).

*Primary Examiner*—Raymond N. Jones
*Assistant Examiner*—Marianne M. Cintins
*Attorney, Agent, or Firm*—Ian C. McLeod

[57] ABSTRACT

A method of inhibiting mold and psychrotrophic bacteria in creamed Cottage cheese using a mixture of *Streptococcus lactis* subspecies diacetylacis and *Propionibacterium shermanii* in the cream dressing or creamed Cottage cheese at refrigeration temperatures is described. The method does allow small volumes of the bacteria causing the inhibition to be used in the Cottage cheese.

4 Claims, No Drawings

METHOD FOR THE PRESERVATION OF CREAMED COTTAGE CHEESE

BACKGROUND OF THE INVENTION

(1) Summary of the Invention

The present invention relates to a bacterial method and compositions for inhibiting mold and psychrotrophic bacteria in creamed Cottage cheese. In particular the present invention relates to a method which uses mixed bacterial concentrates of *Streptococcus lactis* subspecies *diacetylactis* and *Propionibacterium shermanii* to provide the inhibition of spoilage microorganisms in creamed Cottage cheese.

(2) Prior Art

Extended shelf life of creamed Cottage cheese is of considerable commercial interest. The primary cause of spoilage is gram negative psychrotrophic bacteria, primarily pseudomonads. Mold is a secondary, but also important, cause of spoilage. Control of these spoilage organisms is readily accomplished by incorporating a chemical preservative in the creamed Cottage cheese.

The preservative can be added by direct addition of the active chemical. For example, potassium sorbate at levels between 0.05% and 0.07% in Cottage cheese effectively inhibits psychrotrophic bacteria and mold. The added sorbate must be declared on the ingredient statement and this is thought by some consumers to detract from the natural concept of Cottage cheese.

Another approach to direct addition of a preservative is to add a naturally derived non-viable antimicrobial product to the Cottage cheese. This product can be declared as a natural ingredient on the label. A commercial product of this type is a milk based mixture of naturally derived organic acids (including acetic and propionic acids). This product claims to be effective against psychrotrophs and mold and can be declared as milk on the ingredient statement of the container for the Cottage cheese. The rather dilute product (7% solids) must be used at a 1% by volume rate in creamed Cottage cheese and must be stored at refrigerator or freezer temperatures which is disadvantageous.

The prior art has described the use of *Streptococcus lactis* subspecies *diacetylactis* in Cottage cheese cream dressing to inhibit psychrotrophic bacteria but not mold. This use is described in U.S. Pat. Nos. 4,172,899 and 4,191,782 to Vedamuthu, 3,968,256 to Sing and 4,477,471 to Gonzalez. In these methods the *Streptococcus lactis* subspecies *diacetylactis* is added to the Cottage cheese cream dressing under refrigeration conditions and the *Streptococcus lactis* subspecies *diacetylactis* produces an inhibitory substance which inhibits psychrotrophic bacteria and develops a diacetyl flavor in the Cottage cheese cream dressing if the citrate metabolizing characteristic has not been altered in the strain used. The problem is that mold is not inhibited in the Cottage cheese cream dressing by the inhibitory substance from *Streptococcus lactis* subspecies *diacetylactis*.

*Streptococcus lactis* subspecies *diacetylactis* has been used with the non-viable fermented milk product and the combination produces effective results. The disadvantage of this method is that the use of the fermented milk product is still required.

Each of the available prior methods for control of spoilage organisms in Cottage cheese has its disadvantages, either real (high cost, limited spectrum) or perceived (preservative added versus all natural). A culture system was needed that combined the natural concept and cost effectiveness of a culture with the broader spectrum available by direct addition of preformed antimicrobials.

It had been thought by those skilled in the art that *Propionibacterium shermanii* had to be fermented in milk and then the bacteria killed, such as by heating, to produce the non-viable fermented milk product with the mold inhibiting substance. It had not been believed that the inhibitory substances generated by this bacterium would develop in the Cottage cheese cream dressing with *Streptococcus lactis* subspecies *diacetylactis*, particularly since it was thought that insufficient organic acids would be produced at the low incubation temperatures encountered in refrigeration.

OBJECTS

It is therefore an object of the present invention to provide a method for inhibiting psychrotrophic bacteria and mold in creamed Cottage cheese using a mixture of *Streptococcus lactis* subspecies *diacetylactis* and *Propionibacterium shermanii* in the dressing at refrigeration temperatures. It is further an object of the present invention to provide a method which is simple and economical and which is regarded as natural as opposed to chemical. These and other objects will become increasingly apparent by reference to the following description.

GENERAL DESCRIPTION

The present invention relates to an improved method for inhibiting mold and psychrotrophic bacteria in creamed Cottage cheese which comprises: inoculating cream dressing for Cottage cheese or a cream dressed Cottage cheese with a mixture of *Streptococcus lactis* subspecies *diacetylactis* and *Propionibacterium shermanii* at a concentration sufficient to inhibit the mold and the psychrotrophic bacteria; and storing the creamed Cottage cheese at refrigeration temperatures, wherein the mold and psychrotrophic bacteria are inhibited for an extended period of time during storage.

The present invention also relates to a bacterial composition for inoculating creamed Cottage cheese dressing or creamed Cottage cheese in order to inhibit mold and psychrotrophic bacteria at refrigeration temperatures which comprises: *Streptococcus lactis* subspecies *diacetylactis*; and *Propionibacterium shermanii*, wherein the ratio of (a) to (b) by cell count is between about 1 to 10 and 10 to 1 and wherein the composition is in storage stable form.

The preferred strains of *Streptococcus lactis* subspecies *diacetylactis* are the lactose negative strains described in U.S. Pat. No. 4,477,471, particularly *Streptococcus lactis* subspecies *diacetylactis* NRRL-B-15005, NRRL-B-15006 and NRRL-B-15018 and parent strain ATCC 15346. The preferred strain of *Propionibacterium shermanii* is NRRL-B-18074 which has been deposited with the Northern Regional Research Laboratory at Peoria, Illinois and is available by name and number.

The *Propionibacterium shermanii* and *Streptoccocus lactis* subspecies *diacetylactis* are preferably used in a ratio between 1 to 10 and 10 to 1 as previously indicated. The cell count of each bacteria in the cream dressing or creamed Cottage cheese is preferably between about $10^5$ and $10^8$ cells per gram and most preferably between $10^6$ and $10^7$ cells per gram.

The concentrate of *Streptococcus lactis* subspecies *diacetylactis* and *Propionibacterium shermanii* can be frozen, lyophilized or dried on an edible carrier. Glycerol or sugars are used as stabilizing agents for frozen cultures as is fresh growth media. Sugars (sucrose) are also used for lyophilizing the bacteria. The methods of preservation of bacteria in storage stable form are well known to those skilled in the art.

SPECIFIC DESCRIPTION

Materials and Methods

*Streptococcus lactis* subspecies *diacetylactis* ATCC 15346 (18-16WT) available from Microlife Technics (Sarasota, FL) as FARGO 702 as a frozen concentrate containing about $1 \times 10^{10}$ CFU per gram was used. The strain produces an inhibitory substance active against psychrotrophs as described in U.S. Pat. No. 4,191,782.

*Propionibacterium shermanii* NRRL-B-18074 was grown in a 10 liter fermenter on a medium containing 3% sodium lactate, 3% whey solids and 1.5% yeast extract by weight. The fermenter was inoculated with a 5% by volume transfer from a 48 hour flask culture propagated at 30° C. without agitation in a medium of 2% whey plus 1% yeast extract by weight. The fermenter was maintained at pH 6.0 with ammonia gas. The fermentation was controlled at 30° C. with constant mechanical agitation at 50 rpm for 48 hours. The cells were removed by centrifugation and resuspended to one-tenth the original volume in the spent growth medium supplemented with 10% glycerol. The cell concentrate was stored at $-28°$ C. in 50 gram aliquots. The cell titer of the concentrate was about $1 \times 10^9$ CFU/gram.

A commercially available fermented milk (Microguard TM, Beaverton, Oregon) was used for comparative purposes. Technical literature supplied with the product indicated that a use level of 1% by volume was effective against both psychrotrophic bacteria and mold in creamed Cottage cheese.

Psychrotrophic bacteria were enumerated by plating samples on crystal violet tetrazolium agar (CVT) as described by Gilliland, S. E., et al. Psychrotrophic Microorganisms in *Compendium of Methods for the Microbiological Examination of Foods* American Public Health Association (Marvin L. Speck, ed.) p 173–178 (1976). CVT plates were incubated aerobically at 24° C. and counted after 48 hours. *Streptococcus lactis* subspecies *diacetylactis* and *Propionibacterium shermanii* were routinely counted on MRS broth (Oxoid, Baskingstoke, Hampshire, England), supplemented with 1.5% by weight agar and incubated anaerobically at 24° C.

The Cottage cheese dressing system used in the study was prepared by supplementing commercial half and half with 1.5% sodium chloride. The pH was adjusted to 5.0 with 85% lactic acid. If the half and half used for the dressing had a psychrotrophic bacteria count below $1 \times 10^3$ CFU/ml, the dressing was inoculated with a 1% by volume transfer from a Cottage cheese cream dressing that contained a natural psychrotrophic bacteria population of $2 \times 10^5$ CFU/ml.

RESULTS

Technical literature available with the non-viable fermented milk stated that the product was effective in applications where the pH was less than 5.3. This is typical of the antimicrobial activity of lipophilic acids. Gas chromatographic analysis of the non-viable fermented milk product showed it to contain about 0.6% by weight acetic acid and 0.4% by weight propionic acid together. Based on the recommended use level for the non-viable fermented milk of 1% by volume, the effective concentration of acetic acid plus propionic acid is only 0.01%. The ability to achieve this concentration via low temperature incubation would afford equal protection to that obtained by direct addition of the active ingredient. The following Examples show that mixtures of *Propionibacterium shermanii* and *Streptococcus lactis* subspecies *diacetylactis* are as effective in producing inhibition.

EXAMPLE 1

A mixture of *Propionibacterium shermanii* NRRL-B-18074 and *Streptococcus lactis* subspecies *diacetylactis* ATCC 15346 was tested in a Cottage cheese cream dressing system. The dressing was distributed into sterile bottles and then inoculated with either *Streptococcus lactis* subspecies *diacetylactis* at a rate of $1.8 \times 10^7$ CFU/ml of dressing, *Propionibacterium shermanii* at $1.4 \times 10^7$ CFU/ml of dressing or a combination of *Streptococcus lactis* subspecies *diacetylactis* and *Propionibacterium shermanii* at $0.9 \times 10^7$ and $0.7 \times 10^7$ CFU/ml of dressing respectively. The inoculated samples were stored at 4° C. and plated after 7, 12 and 25 days. The results are shown in Table 1.

TABLE 1

Inhibition of psychrotrophic bacteria by *Streptococcus lactis* subspecies diacetylactis and *Propionibacterium shermanii* in Cottage cheese dressing during storage at 4° C.[1]

| Treatment | Days of Storage | | | |
|---|---|---|---|---|
| | 0 | 7 | 12 | 25 |
| | (CFU × $10^4$/ml) | | | |
| No culture | 6.6 | 23.0 | 25.0 | 25.3 |
| S. diacetylactis[2] | 6.6 | 17.2 | 7.4 | 3.3 |
| P. shermanii[3] | 6.6 | 7.0 | 9.2 | 4.1 |
| S. diacetylactis and P. shermanii[4] | 6.6 | 2.1 | 1.6 | 2.7 |

[1]Dressing was prepared using commercial half and half supplemented with 1.5% NaCl. The pH was adjusted to 5.0 with 85% lactic acid.
[2]*Streptococcus lactis* subspecies diacetylactis ATCC 15346 was added at a rate of 1.8 × $10^7$ CFU per ml of dressing.
[3]*Propionibacterium shermanii* NRRL-B-18074 was added at a rate of 1.4 × $10^7$ CFU per ml of dressing.
[4]*Streptococcus lactis* subspecies diacetylactis ATCC 15346 was added at a rate of 0.9 × $10^7$ CFU per ml of dressing and *Propionibacterium shermanii* NRRL-B-18074 was added at a rate of 0.7 × $10^7$ CFU per ml of dressing. The control was also plated on day 0 to determine the initial bacterial load.

EXAMPLE 2

In this Example it was to be determined whether the improvement observe using the *Streptococcus lactis* subspecies *diacetylactis* ATCC 15346 and *Propionibacterium shermanii* NRRL-B-18074 was similar to that observed when the non-viable fermented milk was used in combination with *Streptococcus lactis* subspecies *diacetylactis* ATCC 15346. The cream cheese dressing was prepared as before. Samples were inoculated with 1% by volume non-viable fermented milk alone; with 1% by volume non-viable fermented product and *Streptococcus lactis* subspecies *diacetylactis* ATCC 15346 or with a combination of *Streptococcus Lactis* subspecies *diacetylactis* ATCC 15346 and *Propionibacterium shermanii* NRRL-B-18074. Psychrotroph counts were conducted after 0, 7 and 20 days of stroage at 4° C. The results are shown in Table 2.

TABLE 2

Inhibition of psychrotrophic bacteria by a *Streptococcus lactis* subspecies diacetylactis ATCC 15346 and *Propionibacterium shermanii* NRRL-B-18074 blend and non-viable fermented milk in Cottage cheese dressing stored at 4° C.[1]

| Treatment | Days at 4° C. | | |
|---|---|---|---|
| | 0 | 7 | 20 |
| | (CFU × $10^3$/ml) | | |
| No addition | 4.8 | 1.8 | 380.0 |
| non-viable fermented milk[2] | 4.8 | 1.9 | 0.8 |
| non-viable fermented milk and *S. diacetylactis*[3] | 4.8 | 0.3 | 0.2 |
| *S. diacetylactis* and *P. shermanii*[4] | 4.8 | 0.1 | 0.2 |

[1] Dressing was prepared using commercial half and half supplemented with 1.5% NaCl. The pH was adjusted to 5.0 with 85% lactic acid.

[2] Non-viable fermented milk was added at a rate of 1% (v/v).

[3] Non-viable fermented milk was added at a rate of 1% (v/v) and *Streptococcus lactis* subspecies diacetylactis ATCC 15346 was added at a rate of $8 \times 10^6$ CFU per ml of dressing.

[4] *Streptococcus lactis* subspecies diacetylactis ATCC 15346 was added at a rate of $8 \times 10^6$ CFU per ml of dressing and *P. shermanii* NRRL-B-18074 was added at a rate of $1.4 \times 10^6$ CFU per ml of dressing.

As expected, all treatments inhibited psychrotroph development. Non-viable fermented milk plus *Streptococcus lactis* subspecies *diacetylactis* ATCC 15346 was shown to be more effective than the non-viable fermented milk alone. The combination of *Streptococcus lactis* subspecies *diacetylactis* ATCC 15346 and *Prepionbackterium shermaii* was as effective as the non-viable fermented milk plus *Streptococcus lactis* subspecies *diaetylactis* ATCC 15346 combination and the two treatments appeared to have the same profile of inhibition.

Example 3

The inhibition of psychrotrophic bacteria in the cream dressing system was tessted in a Cottage cheese system. Dry curd Cottage cheese was obtained from a local dairy. One hundred sixty-five grams of cheese was dressed with 85 grams of the standard cream dressing of Examples 1 and 2. The dressed cheese was then inoculated with *Streptococcus lactis* subspecies *diacetylactis* ATCC 15346 at $4.2 \times 10^5$ CFU per gram dressed cheese and *Propionibacterium shermanii* NRRL-B-18074 at a rate of $3.3 \times 10^6$ CFU per gram of dressed cheese. The samples were incubated at 4° C. and sampled for psychrotrophic bacteria titer after 10 and 26 days. The results are shown in Table 3.

TABLE 3

Inhibition of psychrotrophic bacteria by a combination of *Streptococcus lactis* subspecies diacetylactis ATCC 15346 and *Propionibacterium shermanii* NRRL-B-18074 in dressed Cottage cheese stored at 4° C.[1]

| Treatment | Days at 4° C. | | |
|---|---|---|---|
| | 0 | 10 | 26 |
| | (CFU × $10^3$/gram) | | |
| None | 9.1 | 11.8 | >100.0 |
| *S. diacetylactis* and *P. shermanii*[2] | 9.1 | 3.9 | 1.4 |

[1] Dry curd Cottage cheese (165 g) was dressed with 85 g dressing (half and half + 1.5% NaCl at pH 5.0)

[2] *Streptococcus lactis* subspecies diacetylactis ATCC 15346 was added at $4.2 \times 10^5$ CFU per gram of dressed cheese and *Propionibacterium shermanii* NRRL-B-18074 was added at a rate of $3.3 \times 10^6$ CFU per gram of dressed cheese.

The physhrotrophic bacteria load in the test Cottage cheese decreased throughout storage while in the control cheese the physchrotrophic bacteria titer increased 10 fold. The same results can be achieved by blending the *Propionibacterium shermanii* and *Streptococcus lactis* subspecies *diacetylactis* into the cream dressing and then adding the blend to dry Cottage cheese.

The volume of addition of culture to the Cottage cheese is very small ($4 \times 10^{-}$=to $1 \times 10^{-3}$ ml per gram). Also the bacterial concentrates are easily stored and shipped.

It is intended that the foregoing description be only illustrative of the present invention and that the invention be limited only by the hereinafter appended claims.

We claim:

1. An improved method for inhibiting mold and psychrotrophic bacteria in creamed Cottage cheese which comprises:
   (a) inoculating cream dressing for Cottage cheese or creamed Cottage cheese with a mixture of *Streptococcus lactis* subspecies *diacetylactis* and *Propionibacterium shermanii* at a concentration sufficient to inhibit mold and the psychrotrophic bacteria; and
   (b) storing the creamed Cottage cheese at refrigeration temperatures, wherein the mold and psychrotrophic bacteria are inhibited for an extended period of time during storage, said extended time period being longer than that achieved by *Streptococcus lactis* subspecies *diacetylactis* alone in the dressing.

2. The method of claim 1 wherein the *Streptococcus lactis* subspecies *diacetylactis* and *Propionibacterium shermanii* are inoculated into the cream dressing or creamed Cottage cheese at a concentration of each between about $10^5$ and $10^8$ cells per ml.

3. The method of claim 1 wherein the ratio of *Streptococcus lactis* subspecies *diacetylactis* to *Propionibacterium shermanii* is between about 1 and 10 and 10 to 1.

4. The method of claim 3 wherein the concentration of *Streptococcus lactis* subspecies *diacetylactis* and *Propionibacterium shermanii* are each between about $10^6$ to $10^7$ cells per ml of Cottage cheese.

* * * * *